Patented Aug. 31, 1948

UNITED STATES PATENT OFFICE 2,448,156

TREATMENT OF BICYCLOPARAFFINS

Louis Schmerling, Riverside, Ill., assignor to Universal Oil Products Company, Chicago, Ill., a corporation of Delaware No Drawing. Application April 27, 1944,
Serial No. 533,054

1 Claim. (Cl. 260—648)

This invention relates to the reaction of an alkyl halide and a bicycloparaffin. More specifically the invention is concerned with the interaction of an alkyl halide and a bicycloparaffin in the presence of a catalyst to produce a halobicycloparaffin.

An object of my invention is the production of a mono-halogenated bicycloparaffin by effecting the reaction of an alkyl halide and a bicycloparaffin in the presence of a Friedel-Crafts type catalyst.

A further object of the invention is to form a haloalkylbicycloheptane by effecting reaction between an alkyl halide and an alkylbicycloheptane in the presence of a catalyst of the Friedel-Crafts type.

In one specific embodiment the present invention comprises a process for reacting a tertiary alkyl halide and a bicycloheptane in the presence of a catalyst of the Friedel-Crafts type under conditions such that the formation of a secondary halobicycloheptane constitutes the principal reaction of the process.

In a more specific embodiment the present invention relates to the production of 2-chlorobicyclo-(2,2,1)-heptane by reacting bicyclo-(2,2,1)-heptane and tertiary butyl chloride in the presence of aluminum chloride.

As used in the present specification and claim, the term "bicycloparaffin" is meant to include bicyclic compounds containing endoalkylene groups such as endomethylene and endo-ethylene but excludes such compounds as decalin. The bicycloparaffins utilizable as starting material for my process may be obtained from any source and are readily obtainable by the condensation of a cyclic conjugated diene such as cyclopentadiene and an olefin under the influence of heat and pressure. The bicycloparaffins may also be obtained by the hydrogenation of naturally-occurring substances as terpenes.

Although tertiary alkyl halides are preferred for this process, primary and secondary alkyl halides may also be employed, though not necessarily with equivalent results nor under the same conditions of operation. The different types of alkyl halides may be obtained from any source. For example, some alkyl halides are produced by effecting reaction of mono-olefinic hydrocarbons and a hydrogen halide such as hydrogen chloride or hydrogen bromide, preferably in the presence of a catalyst such as a metal halide of the Friedel-Crafts type, a mineral acid such as sulfuric or phosphoric and other acid catalysts. The addition of a hydrogen halide to an olefin results in the production of tertiary alkyl halides from tertiary olefins such as isobutylene, tri-methyl ethylene, etc., and of secondary alkyl halides from non-tertiary olefins containing 3 or more carbon atoms per molecule.

The process of my invention is effectively carried out in the presence of a catalyst of the Friedel-Crafts type. Active metal halide catalysts suitable for use include aluminum chloride, aluminum bromide, zirconium chloride, zinc chloride, ferric chloride, etc. The reaction may also be performed in the presence of a metal halide, such as aluminum chloride, dissolved in nitromethane or other nitro paraffin. In the latter instance, the product from the reaction of bicyclo-(2,2,1)-heptane, for example, apparently contains some butylated bicycloheptane as well as the chloro compound, 2-chlorobicyclo-(2,2,1)-heptane. The conditions of operation which may be used with these catalysts differ depending upon the particular catalytic activities and other factors. The catalytic material may be utilized as such or it may be composited with another catalyst or deposited upon solid carriers or supporting material to produce catalyst composites of the desired activities. Catalyst carriers or supports include both adsorptive and substantially non-adsorptive materials, such as alumina, activated charcoal, crushed porcelain, raw and acid treated clays, and diatomaceous earth. The carriers should be substantially inert so that no interaction which is detrimental to the activity or selectivity of the catalyst composites tends to occur between the carrier and the Friedel-Crafts type catalyst.

The present process for effecting a halogen-hydrogen transfer between an alkyl halide and bicycloparaffin may also be catalyzed by boron fluoride and hydrogen fluoride, although such a conversion is not necessarily carried out under the same conditions of operation as are used when a metal halide of the Friedel-Crafts type is employed.

The reaction of an alkyl halide and a bicycloparaffin may be illustrated by the following equation which shows the reaction between bicyclo-(2,2,1)-heptane and tertiary butyl chloride to form 2-chlorobicyclo-(2,2,1)-heptane, also known as 2-chloronorcamphane.

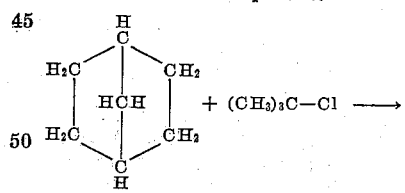

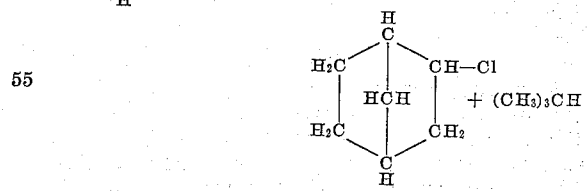

The transfer of halogen from an alkyl halide to a bicycloparaffin is effected by reacting said hydrocarbon and alkyl halide in the presence of a Friedel-Crafts type catalyst at a temperature from about −40° to about +100° C. and preferably from about −20° to about +20° C. The conditions of operation will vary depending upon the particular starting materials and catalysts which are employed.

The reaction of an alkyl halide with a bicycloparaffin of the type herein set forth may be carried out using either batch or continuous types of operation. In batch type operation the desired proportions of alkyl halide and bicycloparaffin are introduced to a reactor containing the halide catalyst or to which the halide catalyst is simultaneously introduced. The catalyst may be present as such or it may be composited with a carrier so that the commingled mixture of alkyl halide and bicycloparaffin may be contacted therewith to form the desired halobicycloparaffin. The reaction mixture, following separation from the catalyst, is subjected to fractional distillation or other treatment to separate unconverted bicycloparaffinic hydrocarbon and unconverted alkyl halide from the higher boiling reaction products. The recovered materials may then be reused.

Continuous operation of the process may be carried out by directing a mixture of a bicycloparaffin and an alkyl halide through a reactor of suitable design containing the catalyst. When using this type of treatment the operating conditions may differ somewhat from those employed in the batch type of treatment.

In some instances, it may be advantageous to commingle the alkyl halide and bicycloparaffin with a substantially inert solvent such as a paraffinic hydrocarbon, for example, normal pentane or a nitroparaffin, for example, nitromethane, and to effect the reaction in the presence of the added solvent. The solvent selected should, of course, be one which does not undergo undesirable reactions at the operating conditions used and one which may be separated from the reaction products.

The halobicycloparaffins produced by my process may be utilized for various purposes. They may be hydrolyzed to form alcohols or reacted with alcohols (including the alcohols formed by their hydrolysis) to form bicycloalkyl ethers such as 2-methoxynorcamphane or dibicycloheptyl ether (also known as norcamphanyl ether). The latter ether has the following formula:

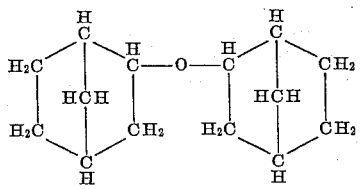

The following examples are introduced to illustrate the process of my invention although they are not presented with the intention of unduly restricting the generally broad scope of the invention.

Example I

A mixture of 52 grams of bicyclo-(2,2,1)-heptane, 52 grams of tertiarylbutyl chloride and 25 grams of normal pentane was introduced to a reactor along with 6 grams of aluminum chloride. The reactor containing the mixture was cooled to −78° C. and 6 grams of aluminum chloride was added. The mixture was stirred and the temperature allowed to rise slowly. Little reaction occurred until the temperature reached −5° C. Stirring was continued at −10 to +5° C. for one half hour. The liquid product was then decanted from a reddish-brown sludge and the liquid was washed, dried, and distilled. Distillation of the liquid product gave a 23% yield of 2-chlorobicyclohexane (2-chloronorcamphane), which had the following physical constants: boiling point, 61–62° C. at 20 mm. pressure; melting point, −5° C.; refractive index, $n_D^{20}$, 1.4832. It was converted to the corresponding alcohol, β-norcamphanol, by heating at 240° C. with water and magnesium oxide. A by-product of this hydrolysis was norcamphanyl ether which had a melting point of 66 to 67° C. and a boiling point of 245 to 250° C. Some of the 2-chloro-bicyclo-(2,2,1)-heptane was also heated with methanol and magnesium oxide at 200° C. and there was obtained 2-methoxy-bicyclo-(2,2,1)-heptane which boiled at 50° C. at a pressure of 77 mm. of mercury and had a refractive index, $n_D^{20}$, of 1.562.

Example II 100 grams of the bicycloheptane was commingled with 50 grams of normal pentane and 10 grams of aluminum chloride and introduced to a reaction vessel. 100 grams of tertiary butyl chloride was added gradually during 45 minutes to the well stirred mixture of bicycloheptane, normal pentane and aluminum chloride, the reaction temperature being maintained at −18 to −10° C. As there was little apparent change, the reaction temperature was permitted to rise to 0° C. and stirring was continued at that temperature for one hour. The liquid product was then separated from a sludge layer and the liquid product was washed, dried and distilled. A 24% yield of 2-chloro-bicyclo-(2,2,1)-heptane (2-chloronorcamphane) was formed based on the material charged.

Example III

A mixture of 100 grams of the bicycloheptane, 50 grams of normal pentane and 10 grams of ferric chloride was introduced to a reactor and 100 grams of tertiary butyl chloride was added to the well stirred mixture. The temperature was maintained at 0 to 2° C. after an hour of continuous stirring at this temperature. The liquid product was decanted, washed, dried and distilled. The yield of 2-chloronorcamphane amounted to 8% of the theoretical based on the charge.

Example IV

A solution of 69 grams of bicycloheptane in 30 grams of n-pentane and a solution of 10 grams of aluminum chloride in 15 grams of nitromethane were stirred together in a reactor and 69 grams of tertiary butyl chloride was added gradually over a period of 40 minutes, the reaction temperature being maintained at 0° C. The product was then stirred at 7 to 10° C. for eight hours, after which the product was decanted from the catalyst layer, washed with water, dried and distilled. There was obtained 15 grams of material boiling at 58 to 65° C. at 20 mm. pressure and having a refractive index, $n_D^{20}$, 1.457. This was a mixture of 2-chloronorcamphane and 2-t-butylbicyclo-(2,2,1)-heptane.

I claim as my invention:

A process which comprises reacting tertiary butyl chloride and bicyclo-(2,2,1)-heptane in the presence of aluminum chloride, said aluminum chloride being dissolved in a nitroparaffin solvent, at a temperature between about −20° C. and about +20° C. to effect conversion of said bicyclo-(2,2,1)-heptane into 2-chloro-bicyclo-(2,2,1)-heptane.

LOUIS SCHMERLING.

REFERENCES CITED

The following references are of record in the file of this patent:

UNITED STATES PATENTS

| Number | Name | Date |
|---|---|---|
| 1,849,844 | Lloyd et al. | Mar. 15, 1932 |
| 2,153,513 | Coleman et al. | Apr. 4, 1939 |

FOREIGN PATENTS

| Number | Country | Date |
|---|---|---|
| 46,529 | Switzerland | Feb. 18, 1908 |

OTHER REFERENCES

Thomas, "Anhydrous Aluminum Chloride in Organic Chemistry," pages 734, 736–7.